(12) United States Patent
Pickering et al.

(10) Patent No.: US 7,580,492 B2
(45) Date of Patent: Aug. 25, 2009

(54) CLOCK RECOVERY

(75) Inventors: Andrew Pickering, Rugby (GB); Simon Forey, Northamption (GB); Robert Simpson, Buckingham (GB); Shaun Lytollis, Northampton (GB)

(73) Assignee: Texas Instruments Incorporated, Dallas, TX (US)

( * ) Notice: Subject to any disclaimer, the term of this patent is extended or adjusted under 35 U.S.C. 154(b) by 553 days.

(21) Appl. No.: 11/151,560

(22) Filed: Jun. 13, 2005

(65) Prior Publication Data

US 2006/0002498 A1    Jan. 5, 2006

(30) Foreign Application Priority Data

Jun. 12, 2004    (GB) .................... 0413144.7

(51) Int. Cl.
*H04L 7/00*    (2006.01)
(52) U.S. Cl. .................... 375/355; 357/376; 357/371; 357/354; 702/189; 702/182; 702/190
(58) Field of Classification Search ............... 375/355, 375/356, 357, 371, 376, 354; 702/189, 182, 702/190
See application file for complete search history.

(56) References Cited

U.S. PATENT DOCUMENTS

| 7,302,365 B2* | 11/2007 | Forey et al. ............... 702/189 |
| 2003/0086339 A1 | 5/2003 | Dally et al. ............... 368/202 |
| 2004/0028164 A1* | 2/2004 | Jiang et al. ............... 375/371 |

* cited by examiner

*Primary Examiner*—Chieh M. Fan
*Assistant Examiner*—Eva Puente
(74) *Attorney, Agent, or Firm*—William B. Kempler; Wade J. Brady, III; Frederick J. Telecky, Jr.

(57) ABSTRACT

Clock recovery apparatus having an early/late voter for deciding whether a current sampling point needs to be advanced or retarded, wherein the early/late voter passes and Up/Down signal to an interpolator for maintaining a clock signal; a frequency accumulator and rate multiplier 30 for generating further signals which are summed with those of the Up/Down signal of the early/late voter to provide an improved control signal to the phase interpolator. The accumulator is responsive to frequency changes in the input signal, and the interpolator acts on said Up/Down signals to adjust the clock signal by stepping it forward or backward according to control need, so that the sampling point can be advanced or retarded.

1 Claim, 3 Drawing Sheets

CLOCK RECOVERY

BACKGROUND OF THE INVENTION

The present invention relates to clock recovery as may be necessary for example to extract data from a datastream. Where no separate clock is available at the receiver, a clock to sample the data must be generated from the datastream itself.

SUMMARY OF THE INVENTION

This and other objects and features are provided, in accordance with one aspect of the invention by a clock recovery apparatus comprising an early/late voter for deciding whether a current sampling point needs to be advanced or retarded, wherein the early/late voter passes an Up/Down signal to an interpolator for maintaining a clock signal. A frequency accumulator and rate multiplier generates further signals which are summed with those of the Up/Down signal of the early/late voter to provide an improved control signal to the phase interpolator. The accumulator is responsive to frequency changes in the input signal, and the interpolator acts on said Up/Down signals to adjust the clock signal by stepping it forward or backward according to control need, so that said sampling point can be advanced or retarded.

DETAILED DESCRIPTION

In FIG. 1 there is shown a datastream made up of differential signals 1 and 2 (R×P and R×N) which, in this case, show a stream of alternate 1's and 0's. The data may be recovered successfully if a clock can be generated to trigger sampling at points S in the datastream, such as for example, a sampling at time of 5 will recover the first 1.

Figure 1A:
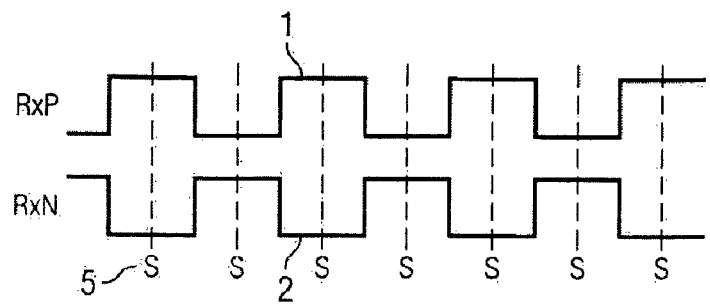
FIG. 1a is a diagram showing the idealised form for a datastream input to a receiver.
Figure 1B:
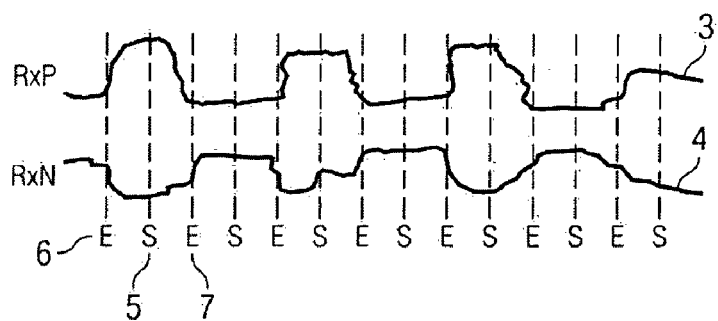
FIG. 1b is a diagram showing an example of the actual form of the datastream input to a receiver, suffering form the effect of noise and distortion.

In practice, the datastream received will not be of the idealised form shown in FIG. 1(a), but more likely be subject to noise and distortion, as shown in FIG. 1(b). In order to determine the sampling instant S, an attempt is made to identify the transitions or edges of the signals 3 and 4. It may then be deduced that samples should be taken substantially midway between the detected edges. Since the edges are subject to noise and jitter they must be tracked and the actual instantaneous sampling point moved accordingly.

Figure 2:
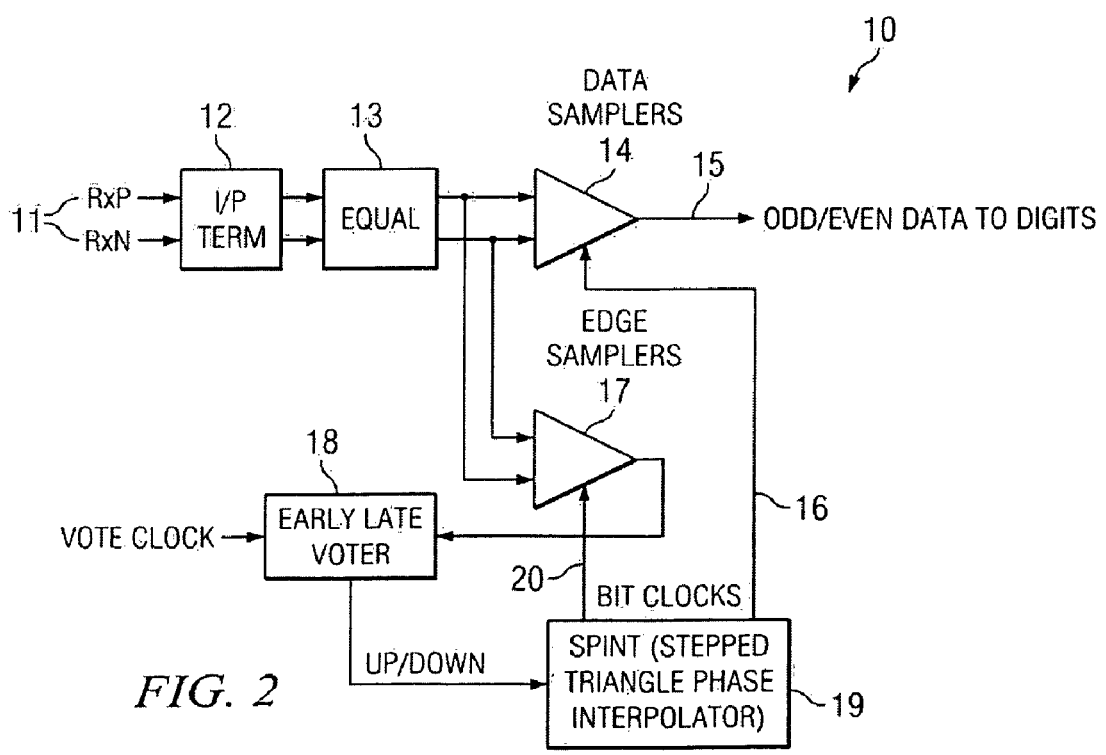
FIG. 2 is a schematic diagram showing an arrangement for performing eye scan.

An arrangement for achieving this is shown in FIG. 2. Input signals 11 are received at receiver 12 and processed by equaliser 13. The data is sampled by data sampler 14 to produce the data output 15. The data sampler is controlled by a clock signal 16 such that if clock signal 16 transitions at the desired sampling instant S, the data will be correctly recovered. Hence signal 16 constitutes a clock recovered at the receiver.

Recovered clock signal 16 is maintained by a stepped phase interpolator 19, which may be controlled to alter the precise sampling instant, such that the changes in the incoming signal may be tracked. Since the data rate of the incoming signal may be very high (equivalent for example to a clock data rate of 2 GHz or more) it is not practicable to control the position of each and every sampling point. Accordingly, the interpolator is used to maintain a clock signal and is adjusted from time to time, for example at one quarter of the recovered clock rate. This is achieved by detecting the edges of the received signal in edge sampler 17 and then using early/late voting 18 to decide whether the current sampling point needs to be advanced or retarded. Accordingly an Up/Down signal is fed to step the phase interpolator. The interpolator is then stepped forward or backward according to the control need.

It will be appreciated that the arrangement of FIG. 2 provides the control to the phase interpolator, based on the phase difference between the current and the desired sampling points.

This system works well, but may be incapable of tracking, for example, large changes in the frequency of the incoming signal as may be encountered for example, in a frequency swept spread spectrum transmission.

Figure 3:
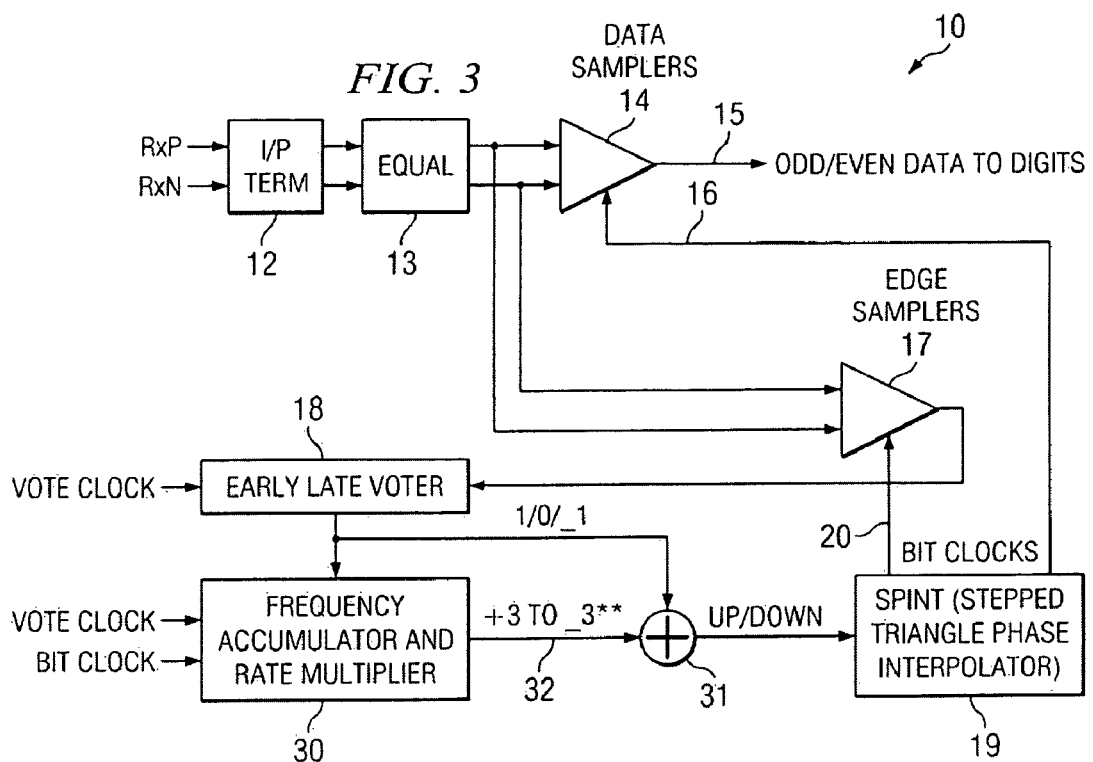
FIG. 3 is a schematic diagram showing a modified arrangement for performing eye scan where both frequency and phase control is provided.

The above problem is overcome by the arrangement of FIG. 3, in which the addition of a frequency accumulator and rate multiplier 30 is shown to generate further signals 32, which are summed with those of the phase response of the early/late voter to provide an improved control signal to the phase interpolator.

The purpose of the accumulator 30 is to be responsive to frequency changes in the input signal and may for example be configured to detect trends in the results of the early/late voter, rather than simply react to the error signal. In this way the range of frequencies for which this system is able to recover the clock may be greatly enhanced.

Figure 4:
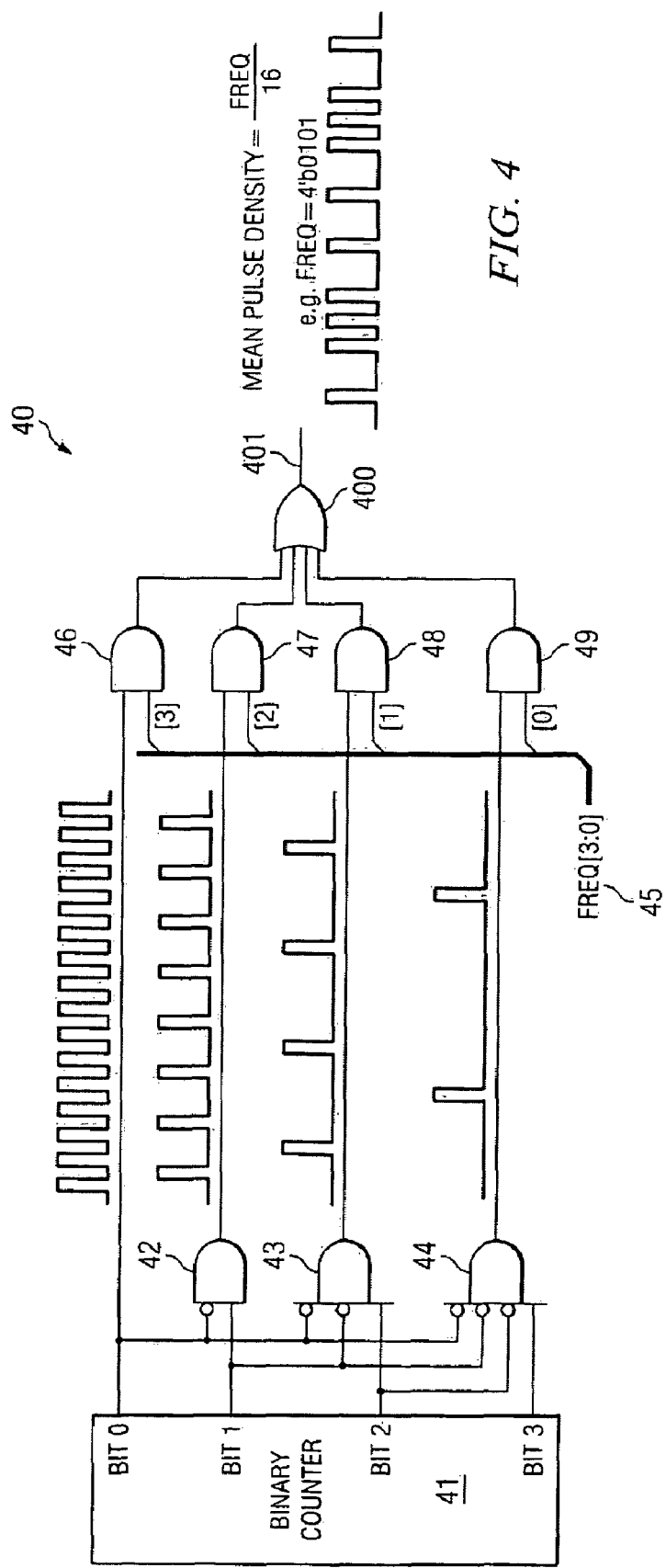
FIG. 4 is a schematic diagram of an exemplary rate multiplier according to a preferred embodiment of the present invention.

In FIG. 4 there is shown an exemplary rate multiplier. A binary counter 41 produces for example, four bits of counter output, which are logically combined in gates 42, 43 and 44 to provide a series of different pulse trains. Dependent upon a control word 45 applied to and gates 46, 47, 48 and 49, these pulse trains are selectively combined to provide an output pulse train, containing a number of pulses in a period defined by the control word.

Figure 5:
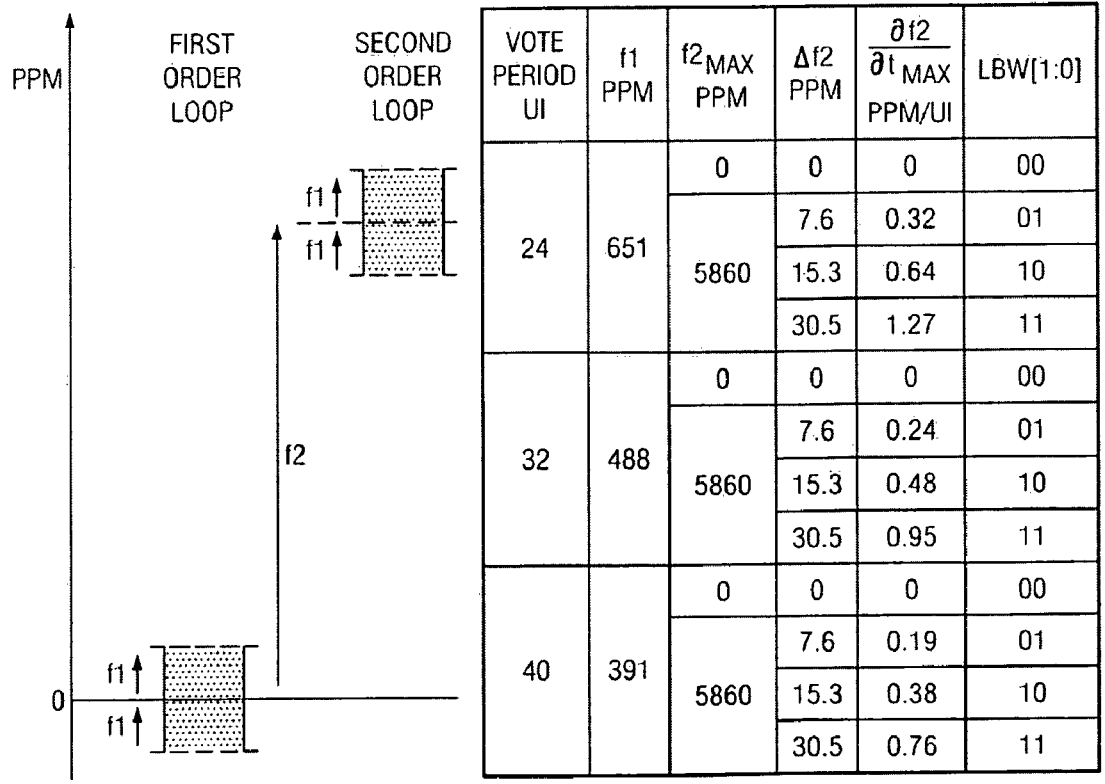
FIG. 5 presents example performance figures for a particular embodiment of this invention which used a 10-bit rate multiplier together with an interpolator with a resolution of 64 phase steps per unit interval (UI) and whose phase could be updated at a maximum rate of one phase step every 2 UI.

Using exemplary embodiments, the improvement provided by the arrangement of FIG. 3 has been calculated and is shown in the table of FIG. 5.

The table in FIG. 5 presents example performance figures for a particular embodiment of this invention which used a 10-bit rate multiplier together with an interpolator with a resolution of 64 phase steps per unit interval (UI) and whose phase could be updated at a maximum rate of one phase step every 2 UI. The table gives values of the 1st order loop offset frequency tracking range (f1 in ppm), the maximum 2nd order loop offset frequency tracking range (f2 max in ppm), the 2nd order loop frequency step size ($\Delta f2$ in ppm) and the maximum 2nd order loop frequency tracking rate ($\partial f2/\partial_{max}$ in ppm/UI) as a function of the voting period and loop bandwidth setting (LBW[1:0]).

The 1st order loop tracking frequency is determined by the fact that the interpolator can at most be adjusted by 1/64 UI every voting period, thus giving: f1=1/64/VP (where VP is the voting period in UI).

The 2nd order loop could theoretically step by one phase step (1/64UI) every 2 UI which would allow it to track offset frequencies of 1/64/2=7813 ppm. However, in this embodiment the frequency accumulator was limited to ¾ of its maximum range (768 rather than 1024) giving a maximum value of 5860 ppm.

For the 10-bit rate multiplier used, each increment of the frequency register results in one extra phase step every 1024 phase update cycles (2048UI), equivalent to a frequency adjustment of 1/64/2048=7.6 ppm. This represents the maximum frequency resolution/accuracy of the 2nd order loop. The loop bandwidth setting (LBW[1:0]) is a 2-bit control value which determines the step size that is applied to the 2nd order loop frequency accumulator as a result of each vote: for LBW=00 the 2nd order loop is disabled and the frequency register forced to zero. For LBW=01, 10 and 11, the frequency accumulator is incremented in step sizes of 1, 2 and 4 respectively, giving values for $\Delta f2$ of 7.6, 15.3 and 30.5 ppm respectively.

The maximum 2nd order frequency tracking rate is simply obtained from the frequency step size divided by the voting period. This means that there is naturally a trade off between the frequency resolution of the 2nd order loop and the rate at which it can track changes in data freqeuncy.

From FIG. 5 it may be seen that the first order system (FIG. 2) is capable of capturing over a frequency range f1. Adding the second order loop (FIG. 3) super imposes this capture range on a much larger capture range f2, which extends the overall capture range to the extent that the arrangement is useful with frequency stepped spread spectrum signals.

A number of other improvements are also derived. For example, if the frequency is increasing and the accumulator 30 may be directly loaded with a code which defines a frequency, which is higher than that to which the interpolated could simply be stepped. Hence, any increased frequency can be captured much more quickly. For example, if a sequence of early/late votes all show that the present clock speed is late, the maximum correction may be immediately applied.

System testing is also facilitated, for example, suppose a known frequency offset were deliberately introduced to the transmitted signal. For receiver left to a free run, that same offset should be present as a control word in the accumulator of the receiver. Hence a text vector value is immediately present.

While the invention has been shown and described with reference to preferred embodiments thereof, it is well understood by those skilled in the art that various changes and modifications can be made in the invention without departing from the spirit and scope of the invention as defined by the appended claims.

The invention claimed is

1. A clock recovery apparatus comprising:

an early/late voter for deciding whether a current sampling point needs to be advanced or retarded, wherein said early/late voter passes an Up/Down signal to a phase interpolator for maintaining a clock signal;

a frequency accumulator and rate multiplier for generating further signals which are summed with an output signal of the early/late voter to provide the Up/Down signal to the phase interpolator, wherein said frequency accumulator and rate multiplier is responsive to frequency changes in an input signal;

the frequency accumulator and rate multiplier comprising a binary counter and a plurality of logic gates, the binary counter is operable to provide a plurality of bits of counter output that are combined in the logic gates to generate an output pulse train constituting said further signals;

wherein said phase interpolator acts on said Up/Down signals to adjust the clock signal by stepping the clock signal forward or backward, so that said sampling point can be advanced or retarded and wherein the plurality of logic gates are arranged in a two-tier structure, each tier comprising a plurality of logic gates;

the first tier of logic gates operable to logically combine the plurality of bits of counter output to provide a series of different pulse trains; and the second tier of logic gates, dependent upon a control word applied thereto, operable to selectively combine the series of different pulse trains to generate the output pulse train constituting said further signals.

* * * * *

UNITED STATES PATENT AND TRADEMARK OFFICE
CERTIFICATE OF CORRECTION

PATENT NO. : 7,580,492 B2
APPLICATION NO. : 11/151560
DATED : August 25, 2009
INVENTOR(S) : Pickering et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Fourteenth Day of September, 2010

David J. Kappos
*Director of the United States Patent and Trademark Office*